US008763301B2

(12) United States Patent
Lau

(10) Patent No.: US 8,763,301 B2
(45) Date of Patent: Jul. 1, 2014

(54) SPINNER ARM

(76) Inventor: Richard C. Lau, Pittsburgh, PA (US)

( * ) Notice: Subject to any disclaimer, the term of this patent is extended or adjusted under 35 U.S.C. 154(b) by 138 days.

(21) Appl. No.: 12/387,657

(22) Filed: May 6, 2009

(65) Prior Publication Data

US 2010/0281756 A1    Nov. 11, 2010

(51) Int. Cl.
 *A01K 85/10*    (2006.01)
 *A01K 85/00*    (2006.01)
(52) U.S. Cl.
 USPC ........................................ 43/42.13; 43/42.11
(58) Field of Classification Search
 USPC ............... 43/42.13, 42.11, 42.14, 42.19, 42.2
 See application file for complete search history.

(56) References Cited

U.S. PATENT DOCUMENTS

| | | | | |
|---|---|---|---|---|
| 2,212,294 A * | 8/1940 | Larzelere | | 43/42.14 |
| 2,281,578 A * | 5/1942 | Heddon | | 43/42.13 |
| 2,674,823 A * | 4/1954 | Gellings | | 43/42.19 |
| 2,741,057 A * | 4/1956 | Morris et al. | | 43/42.13 |
| 2,877,592 A * | 3/1959 | Basgall | | 43/42.19 |
| 2,940,204 A * | 6/1960 | Mehnert | | 43/42.19 |
| 3,996,688 A * | 12/1976 | Hardwicke, III | | 43/42.11 |
| 4,011,681 A * | 3/1977 | Johnson | | 43/42.11 |
| 4,033,065 A * | 7/1977 | Shannon | | 43/42.13 |
| 4,133,135 A * | 1/1979 | Miles | | 43/42.13 |
| 4,201,008 A * | 5/1980 | Sparkman | | 43/42.13 |
| 4,209,932 A * | 7/1980 | Pate | | 43/42.13 |
| 4,551,940 A * | 11/1985 | East | | 43/42.13 |
| 4,625,448 A * | 12/1986 | Borders | | 43/42.13 |
| 4,637,158 A * | 1/1987 | Reid | | 43/42.14 |
| 4,640,041 A * | 2/1987 | Stanley | | 43/42.13 |
| 4,671,007 A * | 6/1987 | Stanczyk | | 43/42.13 |
| 4,718,191 A * | 1/1988 | Gentry | | 43/42.13 |
| 4,742,639 A * | 5/1988 | Gunn | | 43/42.13 |
| 4,750,290 A * | 6/1988 | Renaud | | 43/42.11 |
| 4,765,085 A * | 8/1988 | Wotawa et al. | | 43/42.13 |
| 4,773,180 A * | 9/1988 | Shimizu | | 43/42.13 |
| 4,793,089 A * | 12/1988 | Long et al. | | 43/42.13 |
| 4,823,500 A * | 4/1989 | Shindeldecker | | 43/42.13 |
| 4,884,358 A * | 12/1989 | Grove et al. | | 43/42.13 |
| 4,885,866 A * | 12/1989 | Vanderplow | | 43/42.19 |
| 4,901,470 A * | 2/1990 | Gentry | | 43/42.13 |
| 4,924,618 A * | 5/1990 | McGahee | | 43/43.6 |
| 5,022,177 A * | 6/1991 | Gibson | | 43/42.13 |
| 5,024,019 A * | 6/1991 | Rust et al. | | 43/42.13 |
| 5,058,309 A * | 10/1991 | Firmin | | 43/42.13 |
| 5,201,784 A * | 4/1993 | McWilliams | | 43/42.13 |
| 5,226,268 A * | 7/1993 | Sisson, Jr. | | 43/42.13 |
| 5,245,781 A * | 9/1993 | Helmuth | | 43/42.19 |
| 5,253,446 A * | 10/1993 | Ogle | | 43/42.13 |
| 5,355,612 A * | 10/1994 | Smith | | 43/42.13 |
| 5,381,621 A * | 1/1995 | Fuller | | 43/42.13 |
| 5,394,636 A * | 3/1995 | Rabideau | | 43/42.13 |
| 5,400,542 A * | 3/1995 | Johnson | | 43/42.13 |

(Continued)

FOREIGN PATENT DOCUMENTS

| JP | 08103193 A * | 4/1996 | A01K 85/10 |
|---|---|---|---|
| JP | 2002065116 A * | 3/2002 | A01K 85/10 |

(Continued)

*Primary Examiner* — Darren W Ark

(74) *Attorney, Agent, or Firm* — William F. Lang, IV; Lang Patent Law LLC

(57) ABSTRACT

A spinnerbait has deviations on its upper arm. The deviations project in directions other than that in which the lure moves through the water, thus providing enhanced shimmer and vibration at minimal cost.

19 Claims, 4 Drawing Sheets

(56) References Cited

U.S. PATENT DOCUMENTS

| | | | | |
|---|---|---|---|---|
| 5,461,819 A * | 10/1995 | Shindledecker | | 43/42.13 |
| 5,481,821 A * | 1/1996 | Stanley | | 43/42.13 |
| 5,499,470 A * | 3/1996 | Reed | | 43/42.13 |
| 5,605,004 A * | 2/1997 | Boullt et al. | | 43/42.13 |
| 5,647,163 A * | 7/1997 | Gorney | | 43/42.13 |
| 5,887,379 A * | 3/1999 | Lockhart | | 43/42.13 |
| 5,930,941 A * | 8/1999 | Hayes, II et al. | | 43/42.13 |
| 5,937,570 A * | 8/1999 | Abdul-Raheem | | 43/44.92 |
| 6,018,901 A * | 2/2000 | DuBois | | 43/42.13 |
| 6,108,961 A * | 8/2000 | Milawski et al. | | 43/42.13 |
| 6,112,451 A * | 9/2000 | Webb | | 43/42.19 |
| 6,158,162 A * | 12/2000 | Loniello | | 43/42.13 |
| 6,173,521 B1 * | 1/2001 | Rockhill, Jr. | | 43/42.13 |
| 6,266,914 B1 * | 7/2001 | Johnson et al. | | 43/42.13 |
| 6,591,543 B2 * | 7/2003 | Sabine | | 43/42.11 |
| 6,601,336 B1 * | 8/2003 | Link | | 43/42.13 |
| 6,665,977 B2 * | 12/2003 | Hammond | | 43/42.13 |
| 6,675,524 B2 * | 1/2004 | McNally et al. | | 43/42.13 |
| 6,684,559 B2 * | 2/2004 | Johnson et al. | | 43/42.13 |
| 6,701,662 B1 * | 3/2004 | Moore | | 43/42.13 |
| 6,796,080 B1 * | 9/2004 | Mathews et al. | | 43/42.13 |
| 6,880,287 B2 * | 4/2005 | Eubanks | | 43/42.13 |
| 7,121,039 B2 * | 10/2006 | Fasnacht | | 43/42.13 |
| 7,360,335 B2 * | 4/2008 | Edwards | | 43/42.13 |
| 7,467,491 B1 * | 12/2008 | Slocum | | 43/42.13 |
| 7,874,094 B2 * | 1/2011 | Brevig | | 43/42.11 |
| 2004/0074134 A1 * | 4/2004 | Morlen | | 43/42.13 |

FOREIGN PATENT DOCUMENTS

| | | | | |
|---|---|---|---|---|
| JP | 2002142615 A | * | 5/2002 | A01K 85/10 |
| JP | 2002291377 A | * | 10/2002 | A01K 85/10 |
| JP | 2002369641 A | * | 12/2002 | A01K 85/10 |
| JP | 2003180203 A | * | 7/2003 | A01K 85/10 |
| JP | 2004049125 A | * | 2/2004 | A01K 85/10 |
| JP | 2004089030 A | * | 3/2004 | A01K 85/10 |
| JP | 2009100685 A | * | 5/2009 | A01K 85/10 |
| JP | 2010022243 A | * | 2/2010 | A01K 85/10 |
| JP | 2012019731 A | * | 2/2012 | A01K 85/10 |

* cited by examiner

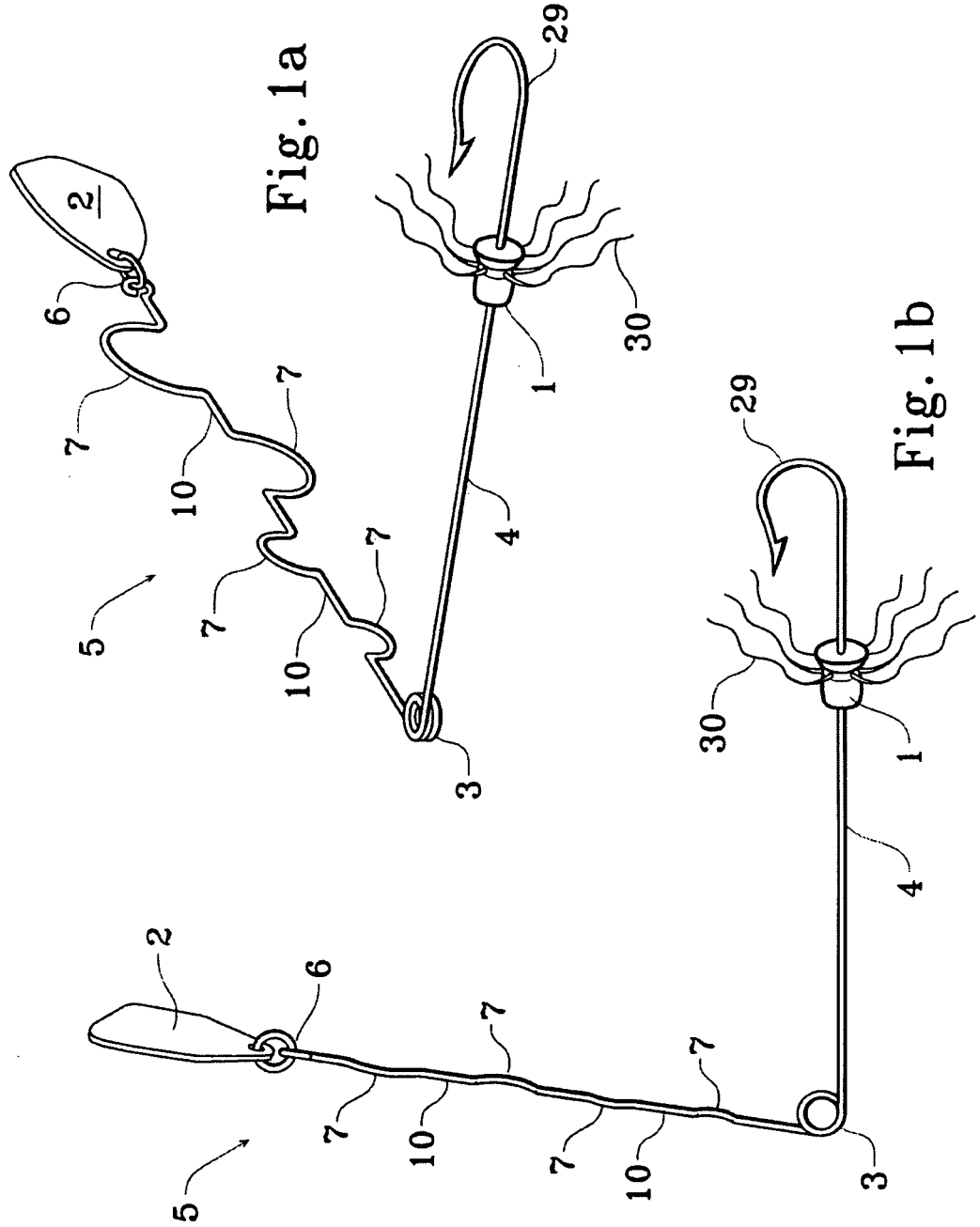

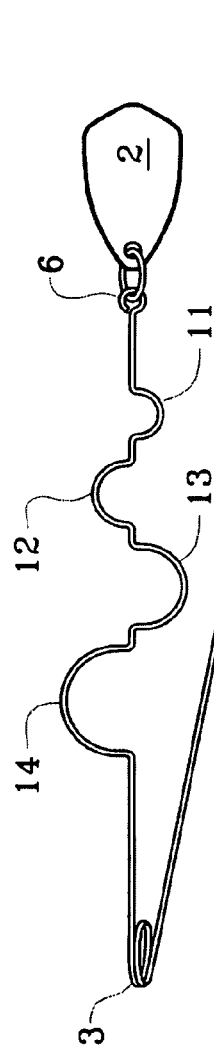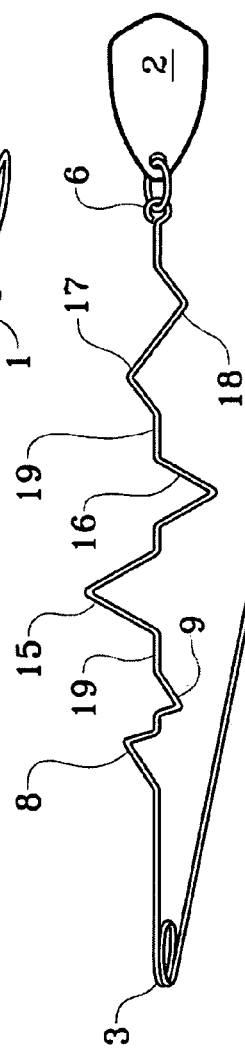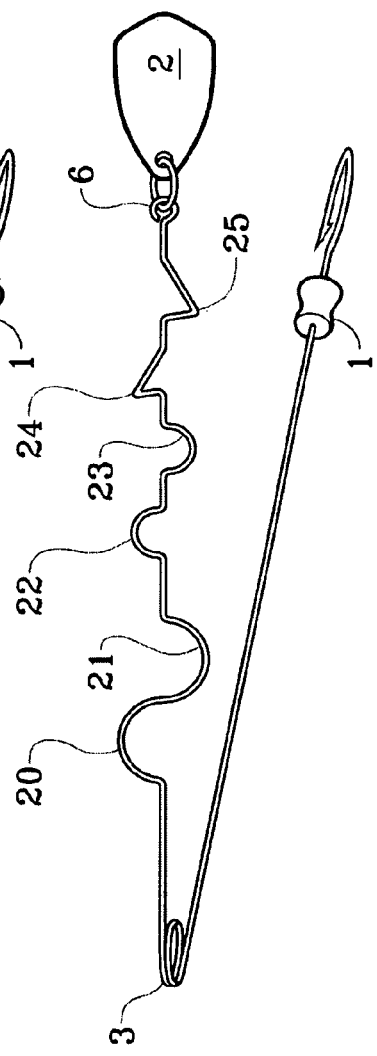

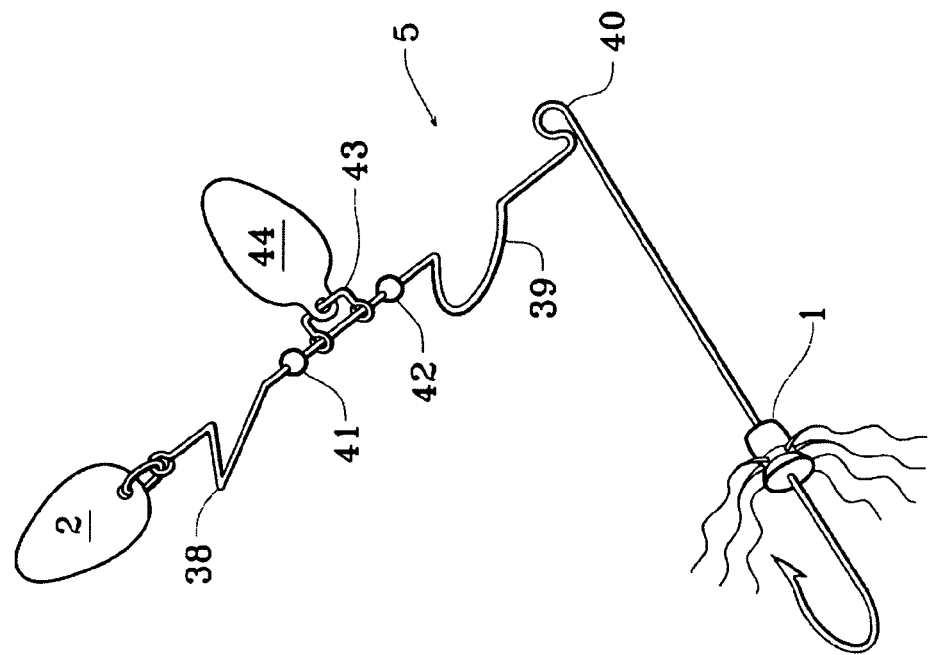
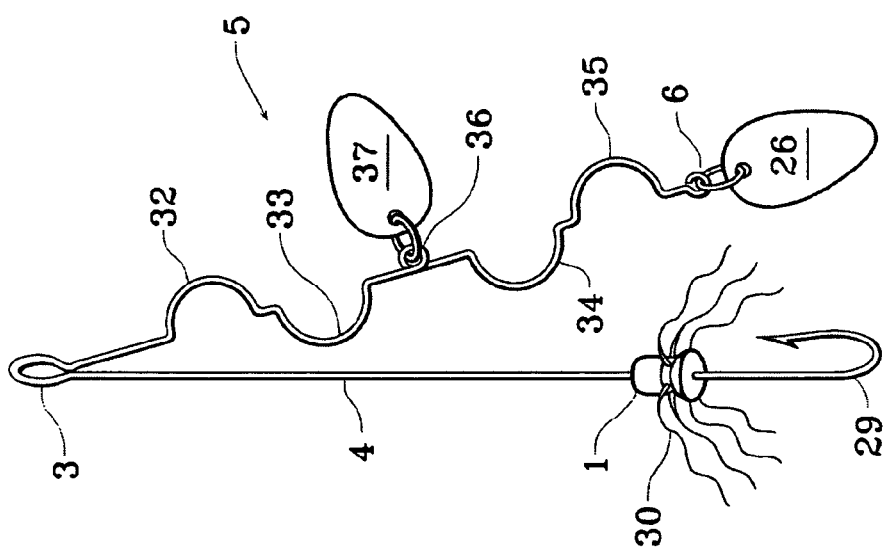

SPINNER ARM

TECHNICAL FIELD

A spinner arm for fishing lures provides improved shimmer and vibration using a simple construction at a minimal cost.

BACKGROUND OF THE INVENTION

A notable advance in the fishing lure art was the introduction of the V-shaped spinner arm to support a spinner connected near the main body of the lure. The basic spinnerbait is well described by Stanley in U.S. Pat. No. 4,640,041. Much effort has been devoted to improvements in spinner attachments—typically in the form of blades—for the V-shaped spinner arms. Although Stanley suggested that the portion of the V nearest the blade (sometimes called the "upper arm") should be tapered to assume a diameter somewhat smaller than that of the portion (the lower arm) connected to the head, hook, or jig, little attention has been paid to the upper arm itself except for the occasional introduction of a clevis or swivel for additional blades, which tends to add considerably to the cost. The upper arm is usually made of straight wire, a unitary part of the V-shaped or L-shaped spinner arm as a whole.

Spinnerbait lures are generally designed to utilize the flow and motion forces—the drag—generated when the lure is moved through the water. The effects of water flowing around spinner blades have been described as shimmer, flutter, vibration, and other similar phenomena known to attract fish. The drag effects are complex, depending on numerous factors in addition to the speed at which the lure is moved through the water. Spinnerbait lures are typically weighted so they will remain oriented with the weighted head and hook on the lower portion of the V while the line is pulled at the apex and the spinner blade trails from the upper segment of the V; hence the term "upper arm.". The shimmer and vibration obtained by structures of the prior art are primarily functions of the design and placement of spinner blades and other attachments. But see Johnson U.S. Pat. 4,011,681, showing a helical spring formed in the upper arm.

Many attempts to improve shimmer and vibration in the past have not provided results commensurate with their elaborate or costly design. There is a need for a simple, inexpensive improvement in spinnerbait design.

SUMMARY OF THE INVENTION

My invention comprises a spinnerbait upper arm for a V-shaped or L-shaped spinnerbait, the upper arm including at least two planar deviations of a size sufficient to enhance movement to the spinner device. The deviations lie in planes offset from that of the V or L formed by the overall arm. By a spinner device, I mean a spinner blade or other device usually attached to the distal end of the upper arm, intended to vibrate, flutter or shimmer to attract fish. By a deviation, I mean a curved portion, angled portion, or combination of a curved and angled portion of the strand, offset, detoured or diverted from the otherwise generally straight upper arm (the otherwise generally straight side of the V or L) which holds the spinner device; a deviation of the strand or wire will return to the generally straight form of the upper arm between the elbow and the spinner device. Although smaller deviations may be used with the understanding that they will convey commensurately lesser benefits, each deviation should occupy at least about 4% of the overall length of the upper arm and each should reach a distance (height) from its base of at least one-fourth of its base. By a planar deviation, I mean a deviation on a single plane. The deviation may be on a plane of any angle between 15° to 165° with respect to the plane of the V or L formed by the spinner arm as a whole, but its geometric form will lie on a single plane—for example, it will not be helical, as in a coiled spring.

In one variation of my invention, the at least two planar deviations are oriented on opposite sides of the strand, on substantially similar angles in opposite directions—for example, 35° on each side of the plane in which the body of the spinner arm lies. In a more specific embodiment of this variation, the at least two deviations are in the same plane, substantially orthogonal to the plane of the V or L formed by the spinnerbait arm. Other variations include one wherein the deviations are substantially semi-circular and one wherein the deviations are substantially angular. Still other variations utilize planar deviations of increasing or decreasing dimensions.

BRIEF DESCRIPTION OF THE DRAWINGS

FIGS. 1a and 1b illustrate a spinnerbait of the invention having four planar deviations, viewed from two different angles.

FIGS. 2a, 2b, and 2c illustrate types of deviations.

FIG. 3 shows a spinnerbait of my invention including a second spinner blade.

FIG. 4 illustrates a somewhat different embodiment of my invention, utilizing an "R" line attachment.

DETAILED DESCRIPTION

Figure 6:
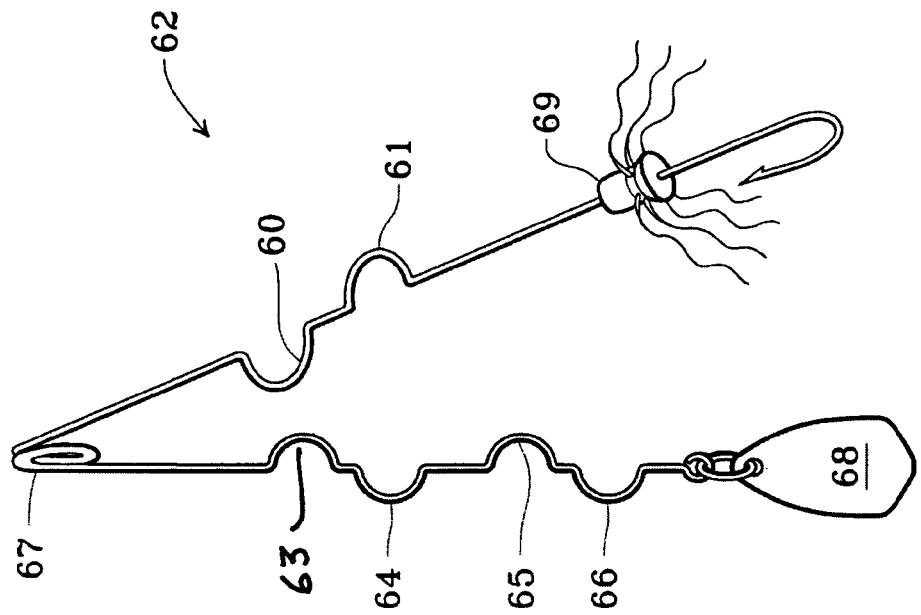
FIG. 6 shows deviations on the lower arm as well as the upper arm of the spinnerbait.

Referring now to FIGS. 1a and 1b, two views of the same basic spinnerbait are shown, having as its principal parts a head 1, a blade 2, and a generally V-shaped or L-shaped wire connecting the head 1 and the blade 2 and having a line loop 3 for attaching the line. The V-shaped or L-shaped wire comprises a lower arm 4 for attaching the head 1 and an upper arm 5 for attaching the blade 2. At the end of the upper arm 5 may be a spinner device loop 6 for attaching the blade 2; any connecting device, such as a clevis or swivel, may be substituted. Hook 29 may be attached to head 1, which may also include a skirt 30 to hide the hook, as is known in the art.

In FIGS. 1a and 1b, the upper arm 5 of my invention exhibits, in this illustration, four deviations 7. The deviations 7 are in this case roughly semicircular and in each case, a short segment of straight wire separates them from the next deviation 7. The deviations 7 of FIGS. 1a and 1b are in substantially the same plane, but increase in dimensions in order from the line loop 3 to spinner device loop 6, and alternate in orientation. Each deviation 7 occupies at least 4% of the overall length of upper arm 5 and may be said to have a height, or distance from a base extending between straight segments 10, of at least one-fourth the dimension of its base. The deviations each lie in a single plane—that is, they are not helical.

FIG. 1b represents a spinnerbait identical to that of FIG. 1a having been rotated about 80°. It is seen that deviations 7 are generally in the same plane, which is orthogonal to the plane formed by the V or L of the spinnerbait wire. In other variations, they may lie in other planes see FIG. 5, for example.

I describe the V-shaped or L-shaped wire (comprising upper arm 5, lower arm 4 and line loop 3) as wire because this is the most convenient material from which to make it. Titanium and ferrous alloys, such as stainless steel, may be used, but I do not intend to be restricted to a type of wire. A unitary strand of wire can be bent into a loop to make the line loop 3 for attaching the line, and the deviations 7 can be imposed on the upper arm 5 in any known or convenient manner, such as by bending, stamping or forming it in a die. However, the upper and lower arms 5 and 4, together with line loop 3, may be molded from various kinds of synthetic polymers.

Whatever the user chooses as a spinner device (here the blade 2), head 1, and/or skirt 30, my deviations will enhance the shimmer and vibration of the spinner device by creating resistance—drag—at various points on the upper arm at very little cost. My deviations will project in directions other than the direction the lure moves through the water, thus creating an erratic fluttering of the upper arm and the spinner device.

In FIGS. 2a, 2b, and 2c, three variations of my upper arm are shown. As in FIGS. 1a and 1b, the upper arms each have a line loop 3 on one end for attaching the line and a spinner device loop 6 for attaching the spinner device (blade 2).

The variation of FIG. 2a shows four deviations. Unlike the variation of FIGS. 1a and 1b, the smallest deviation 11 is near the blade 2. All of the deviations 11, 12, 13, and 14 are substantially in the same plane. Line loop 3 is bent so the plane in which deviations 11, 12, 13, and 14 lie is substantially orthogonal to the plane formed by the overall V or L shape of the spinnerbait arm as a whole. The generally round configurations of deviations 11, 12, 13, and 14 need not be precisely semicircular—they may be parabolic or somewhat flattened.

FIG. 2b shows angled deviations 8, 9, 15, 16, 17 and 18, again generally in the plane orthogonal to that formed by the overall spinner arm and exhibiting varying angles and dimensions. The angles may vary from about 10 degrees to about 120 degrees or larger. As with FIGS. 1a and 1b, short linear segments 19 between the deviations may follow a substantially straight line from line loop 3 to spinner device loop 6. Such straight line segments between deviations are not essential, however; note there is no such segment between deviations 17 and 18.

FIG. 2c illustrates that both rounded planar deviations 20, 21, 22, and 23, and angled planar deviations 24 and 25 may be included in the same upper arm. In this variation, deviations 20 and 21 are not separated by a short linear segment.

As in FIGS. 1a and 1b, the spinner device illustrated in FIGS. 2a, 2b, and 2c as blade 2 attached to spinner device loop 6, may be any suitable spinner device, and spinner device loop 6 may be replaced by any suitable linking means, such as a clevis or ring.

FIG. 3 shows a whole spinnerbait of my invention, this one having a second spinner device 37 connected to my novel spinnerbait upper arm 5. The orientation of FIG. 3 is substantially similar to FIG. 1a, showing the head 1, lower arm 4, line loop 3, and spinner device loop 6, holding spinner device 26. The contours and dimensions of planar deviations 32, 33, 34 and 35 are illustrative only—any of the styles illustrated in the figures may also be used. Here, a ring 36 is deployed between deviations 33 and 34, holding a second spinner device 37, which may be free to flutter around the upper arm 5. The basic structure of the V or L is similar to the variations of FIGS. 1a and 1b, and the deviations may be orthogonal to the plane formed by the V or L, or in some other manner different from that formed by the V or L, as explained with reference to FIG. 5.

FIG. 4 also illustrates a whole spinnerbait, this one having two small planar deviations 38 and 39, a spinner device (blade 2), and an "R" bend 40 for connecting the line, at the same time forming the generally V-shaped or L-shaped angle of the spinnerbait arm. In this instance I also show beads 41 and 42 on the upper arm 5 to assure that clevis 43 remains in place on upper arm 5. Clevis 43 retains a second spinner device, blade 44, which is free to flutter and rotate as the flow of water dictates. As in any of the other variations of my invention, the head 1 may, and normally will, be attached to a hook and a skirt as illustrated in FIG. 3, for example. FIG. 4 again illustrates that the deviations of any of my structures may lie in a plane different from that of the basic V or L of the spinnerbait arm.

Figure 5:
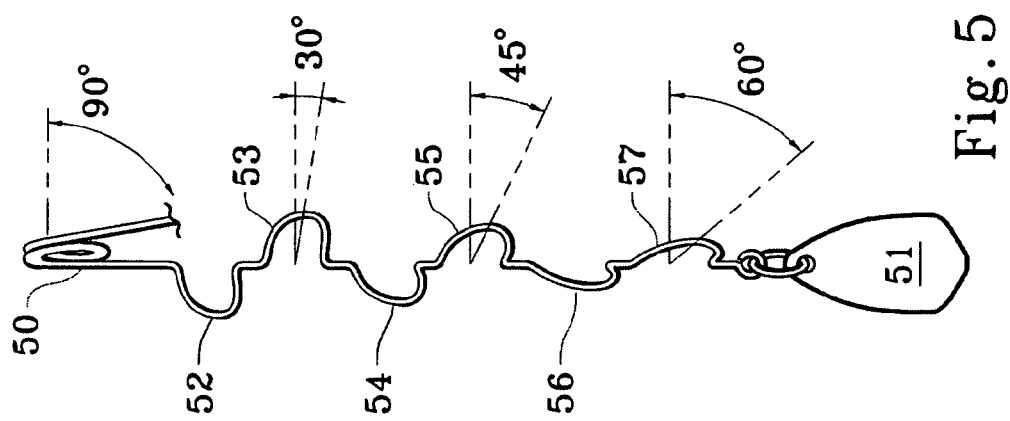
In FIG. 5, deviations are projected in planes at 30°, 45°, and 60° from the plane of the spinnerbait V.

FIG. 5 illustrates an upper arm variation is which alternate planar deviations lie in planes at 30°, 45°, and 60° from the plane formed by the spinnerbait V. The upper arm, extending from loop 50 to spinner blade 51, includes two planar deviations 52 and 53 lying in planes 30° offset from the plane of the V, planar deviations 54 and 55 in planes 45° offset from the plane of the V, and planar deviations 56 and 57 lying in planes 60° offset from the plane of the V.

In FIG. 6, the generally L-shaped spinnerbait arm extends from spinner blade 68 through elbow (loop) 67 to head 69. Deviations 60 and 61 are present on lower arm 62 in addition to planar deviations 63, 64, 65, and 66 on the upper arm.

As R bend 40 (FIG. 4) or line loops 3, 50, or 67 may be likened to an elbow, I use the term "elbow" to describe the apex of the V or L shape of the spinnerbait arm. The term is intended to include any configuration or device at or near the apex of the V or L formed by the overall arm, designed to accommodate a fishing line. The plane on which the V or L lies may be imagined as determined or formed by three points—on the elbow, the proximal end, and the distal end of the spinnerbait arm.

Thus it is seen that my invention includes a spinner arm for a fishing lure comprising (a) a lower arm member having a proximal end for attachment to a head (b) an upper arm member having a distal end for attachment to a spinner device and (c) an elbow connecting the lower arm member and the upper arm member, the lower and upper arm members forming a V-shaped or L-shaped angle on a spinner arm plane with the elbow as its apex, the upper arm member including at least two deviations lying in planes at planar angles 150 to 1650 from the spinner arm plane. The deviations may beneficially lie at planar angles 30° to 150° from the spinner arm plane.

My invention also includes a spinner arm for a fishing lure, the spinner arm having at least two planar deviations between the elbow and the spinner attachment portion, each of the deviations comprising at least 4% of the length of the spinner arm between the elbow and the spinner attachment portion, the deviations lying in planes other than that defined by the spinner arm and being separated by segments of undiverted spinner arm.

It also is an upper arm for a spinnerbait comprising a wire having an elbow on a proximal end for attaching a line, a distal end for connecting to a spinner, and a central portion including at least two planar deviations, each of the planar deviations occupying at least 4% of the length of the central portion and lying in planes other than that defined by points on said proximal end, said distal end, and said elbow.

The invention claimed is:

1. An upper arm for a spinner bait comprising a wire having an elbow on a proximal end for attaching a line, a distal end for connecting to a spinner, and a central portion defining at least two planar deviations, each of said deviations being integrally formed with said spinner arm, said deviations being separated from each other by interconnecting arm segments extending between the deviations, each of said planar deviations occupying at least about 4% of the length of said central portion and lying in planes other than a plane defined by points on said proximal end, said distal end and said elbow, each of said deviations lying essentially within a single respective plane, each of the interconnecting arm segments being substantially coaxial with portions of the upper arm which are adjacent to the proximal and distal ends of the upper arm.

2. The upper arm of claim 1 wherein said at least two planar deviations are curved.

3. The upper arm of claim 1 wherein said at least two planar deviations are angled.

4. The upper arm of claim 1, wherein the deviations are formed from bends defined within the upper arm.

5. The upper arm of claim 1, wherein the deviations are formed from projections defined within the upper arm.

6. A spinner arm for a fishing lure comprising (a) a lower arm member having a proximal end for attachment to a head, (b) an upper arm member having a distal end for attachment to a spinner device, and (c) an elbow connecting said lower arm member and said upper arm member, said lower and upper arm members forming a V-shaped or L-shaped angle in a spinner arm plane with said elbow at its apex, at least one of said upper arm member and said lower arm member including at least two deviations integrally formed with said at least one of the upper arm member and lower arm member, the deviations being separated from each other by interconnecting arm segments extending between the deviations, the deviations lying in planes at planar angles of about 15° to about 165° from said spinner arm plane, the interconnecting arm segments extending between the deviations such that the interconnecting arm segments are essentially in the same plane as said spinner arm plane.

7. The spinner arm of claim 6 wherein said V-shaped or L-shaped angle is between about 60 degrees and about 100 degrees.

8. The spinner arm of claim 6 wherein said upper arm member includes said planar deviations and each of said planar deviations occupies at least about 4% of a length of said upper arm member.

9. The spinner arm of claim 1 wherein said planar deviations lie in the planes at planar angles of about 30° to about 150° from said spinner arm plane.

10. The spinner arm of claim 9 wherein said planar deviations lie in the planes substantially orthogonal to the spinner arm plane of said V-shaped or L-shaped angle.

11. The spinner arm of claim 6, wherein the deviations are formed from bends defined within said at least one of the upper arm member and the lower arm member.

12. The spinner arm of claim 6, wherein the deviations are formed from projections defined within said at least one of the upper arm member and the lower arm member.

13. The spinner arm according to claim 6, wherein the interconnecting arm segments are substantially coaxial with a portion of the at least one of the upper arm member and lower arm member of the spinner arm.

14. In a fishing lure comprising a hook, a head attached thereto, a spinner device, and a substantially V-shaped or L-shaped spinner arm connecting said head and said spinner device, said spinner arm including an elbow and a spinner attachment portion, the improvement comprising:

said spinner arm defining at least two planar deviations between said elbow and said spinner attachment portion, each of said deviations being integrally formed with said spinner arm, each of said deviations comprising at least about 4% of a length of said spinner arm between said elbow and said spinner attachment portion, said deviations being separated from each other by interconnecting arm segments extending between the deviations, said deviations lying in planes other than a plane defined by said spinner arm and being separated by said interconnecting arm segments, each of said deviations lying essentially within a single plane, each of the interconnecting arm segments extending between the deviations such that the interconnecting arm segments are essentially within the same plane as said spinner arm.

15. The fishing lure of claim 14 wherein said at least two planar deviations are curved.

16. The fishing lure of claim 14 wherein said at least two planar deviations are angled.

17. The fishing lure of claim 14, wherein the deviations are formed from bends defined within the spinner arm arm.

18. The fishing lure of claim 14, wherein the deviations are formed from projections defined within the spinner arm.

19. The fishing lure according to claim 14, wherein the interconnecting arm segments are substantially coaxial with a portion of the spinner arm.

\* \* \* \* \*